No. 704,070. Patented July 8, 1902.
D. N. MELVIN.
MACHINE FOR THE MANUFACTURE OF INLAID LINOLEUM.
(Application filed Oct. 23, 1901.)
(No Model.) 7 Sheets—Sheet 4.

WITNESSES:

INVENTOR
David Neilson Melvin
BY
ATTORNEY

No. 704,070. Patented July 8, 1902.
D. N. MELVIN.
MACHINE FOR THE MANUFACTURE OF INLAID LINOLEUM.
(Application filed Oct. 23, 1901.)
(No Model.) 7 Sheets—Sheet 5.

WITNESSES:

INVENTOR
David Neilson Melvin
BY
ATTORNEY

No. 704,070. Patented July 8, 1902.
D. N. MELVIN.
MACHINE FOR THE MANUFACTURE OF INLAID LINOLEUM.
(Application filed Oct. 28, 1901.)
(No Model.) 7 Sheets—Sheet 7.

WITNESSES:
Gustave Dieterich
John Kehlenbeck

INVENTOR
David Neilson Melvin
BY
Chas. C. Gill
ATTORNEY

UNITED STATES PATENT OFFICE.

DAVID NEILSON MELVIN, OF LINOLEUMVILLE, NEW YORK.

MACHINE FOR THE MANUFACTURE OF INLAID LINOLEUM.

SPECIFICATION forming part of Letters Patent No. 704,070, dated July 8, 1902.

Application filed October 23, 1901. Serial No. 79,700. (No model.)

*To all whom it may concern:*

Be it known that I, DAVID NEILSON MELVIN, a subject of the King of Great Britain, and a resident of Linoleumville, in the county of Richmond and State of New York, have invented certain new and useful Improvements in Machines for Use in the Manufacture of Inlaid Linoleum Floor-Cloth, of which the following is a specification.

The invention relates to machines for use in the manufacture of inlaid linoleum floor-cloth; and it consists in the novel features, arrangements, and combinations of parts hereinafter described, and particularly pointed out in the claims.

The object of the invention is to provide means for more rapidly, expeditiously, and correctly manufacturing inlaid linoleum floor-cloth than has been possible by the machines heretofore constructed and known to me.

The present invention is more especially designed as an improvement upon the apparatus shown and described in Letters Patent of the United States No. 412,279, granted October 8, 1898, to David Neilson Melvin.

In accordance with the procedure described in the said Patent No. 412,279 the tesseræ or shapes of the linoleum composition in an unseasoned state were applied upon pattern or pin blocks, and these pattern or pin blocks were then inverted upon the canvas foundation and pressure applied upon said blocks for causing the tesseræ to adhere to the canvas. Thereafter the pattern or pin blocks were manually elevated from the tesseræ then adhering to the canvas, and the tesseræ carried by the canvas were then subjected to a further operation, which consisted in applying a hot plate upon the tesseræ and subjecting the same to pressure for the purpose of completing the floor-cloth. The handling of this hot plate was a feature involving considerable time and expense, as will be apparent when it is assumed that linoleum floor-cloth is customarily made about six feet in width. The hot plate, therefore, was necessarily of considerable size and weight and had to be handled with the aid of machinery and with care, besides requiring means to maintain its temperature. The press shown in said Patent No. 412,279 is equipped with a traveling ram which required to be shifted laterally, so that the hot plate might be placed over the tesseræ and then returned to position above the hot plate, which operations also consumed considerable time. The means shown and described in the said Patent No. 412,279 have been successfully used in the manufacture of the very large amounts of linoleum floor-cloth; but the process of manufacturing with said means has necessarily been slow, and the purpose of the present invention is to afford means for assuring the convenient, rapid, and correct manufacture of the goods and to avoid much of the labor, time, and expense consumed in manufacturing in accordance with the apparatus shown in the said patent No. 412,279 without departing from the processes made the subject of the claims of the said patent. In carrying out my present invention I make use of the pattern or pin blocks described in the said Patent No. 412,279 and apply upon the same the shapes or tesseræ of linoleum composition while in an adherent spongy or unseasoned state, the blocks then being utilized for transferring the tesseræ arranged in the desired pattern upon the canvas or other foundation, where they are affixed by pressure. In carrying out the invention I do not, however, employ a press having the traveling ram described in the said Patent No. 412,279, nor do I manually elevate the pattern or pin blocks from the tesseræ after the latter have been pressed upon the canvas, nor do I make use of the hot plate referred to in said Patent No. 412,279 between the platen of the press and the upper surface of the tesseræ.

The apparatus in the preferred form of my invention comprises a press whose platen equals the width of the linoleum fabric and has simply a vertical movement and through which press the foundation fabric is carried automatically. The pattern or pin blocks carrying the tesseræ are applied upon the foundation canvas on the feed-table of the said press and are carried below the said platen of the press, where they remain stationary while the platen of the press descends and affixes the tesseræ upon the canvas. The ascent of the platen of this press serves to actuate the mechanism by which the canvas, with the pin-block thereon, is carried from below the platen to the table at the rear of the same, where means are provided for stripping the tesseræ then adhering to the canvas from the pin or pattern block while the latter travels onward. The pin or pattern blocks constituting a part of the present apparatus have serrated edges conforming to the tesseræ and match one another, so that said pattern or pin blocks may be fed one against another upon the canvas foundation, in which respect said blocks differ from the pin or pattern blocks of said Patent No. 412,279. The canvas foundation carrying the tesseræ thence passes to and through a specially-constructed second press, which exerts the finishing pressure required for completing the floor-cloth. This second press comprises a heated roller with smaller encompassing rollers and means for operating the rollers. From this second press the floor-cloth passes to and is acted upon by a cold roller, and from this roller the floor-cloth will be delivered to any suitable means for winding it into a roll. Intermediate the two presses of the present apparatus is formed a well, within which a loop of the traveling canvas, with the tesseræ thereon, is formed, this loop preventing either press from intefering with the other press in the event of any inharmonious action in said presses.

The invention will be fully understood from the detailed description hereinafter presented, reference being had to the accompanying drawings, in which—

Fig. 6 is a top view of the first press.

In the drawings, 25 denotes the first press by which the tesseræ are affixed to the canvas 26 or other foundation, 27 the second or roller press through which the foundation having the tesseræ thereon passes and which exerts the finishing pressure, and 28 the cold-roller mechanism, which acts upon the floor-cloth as it leaves the second press 27, the floor-cloth after passing from the cold-roller mechanism 28 being suitably wound by any convenient means into the usual roll.

Figure 1:
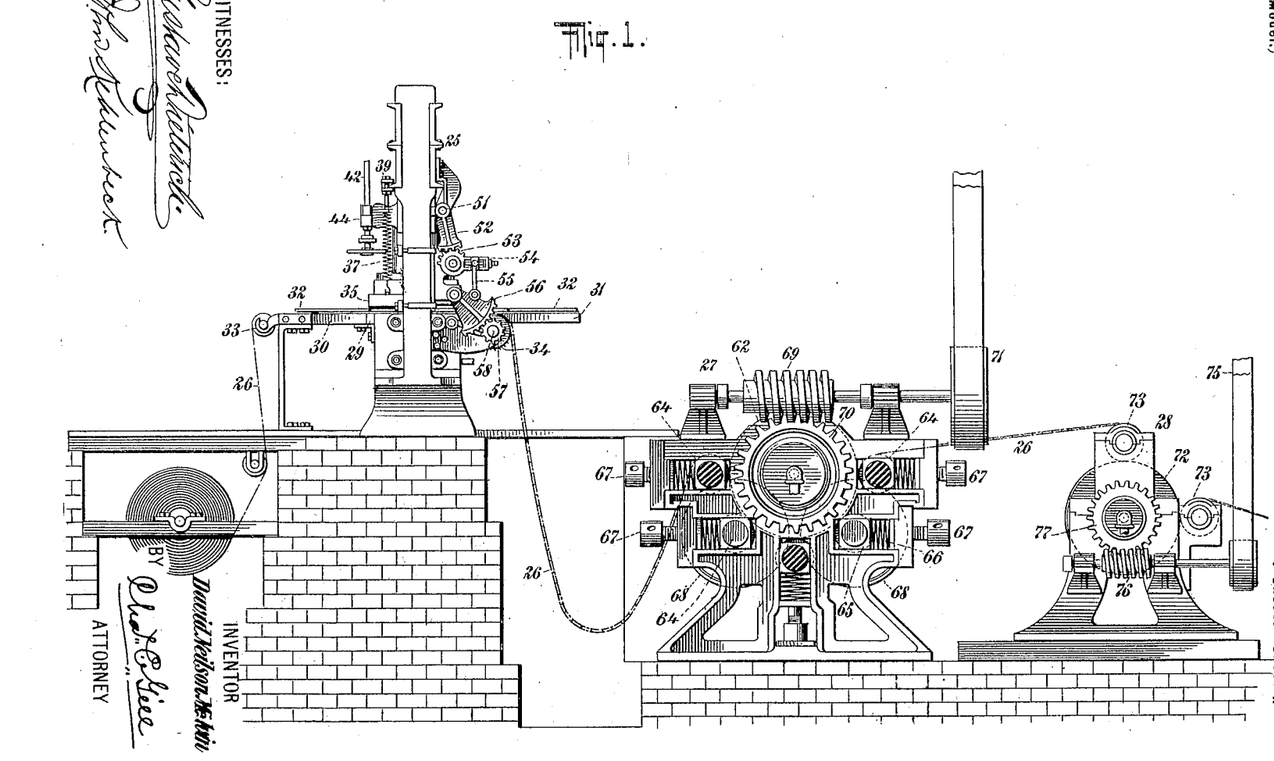
Figure 1 is a side elevation of a complete machine embodying the invention.
Figures 2, 3:
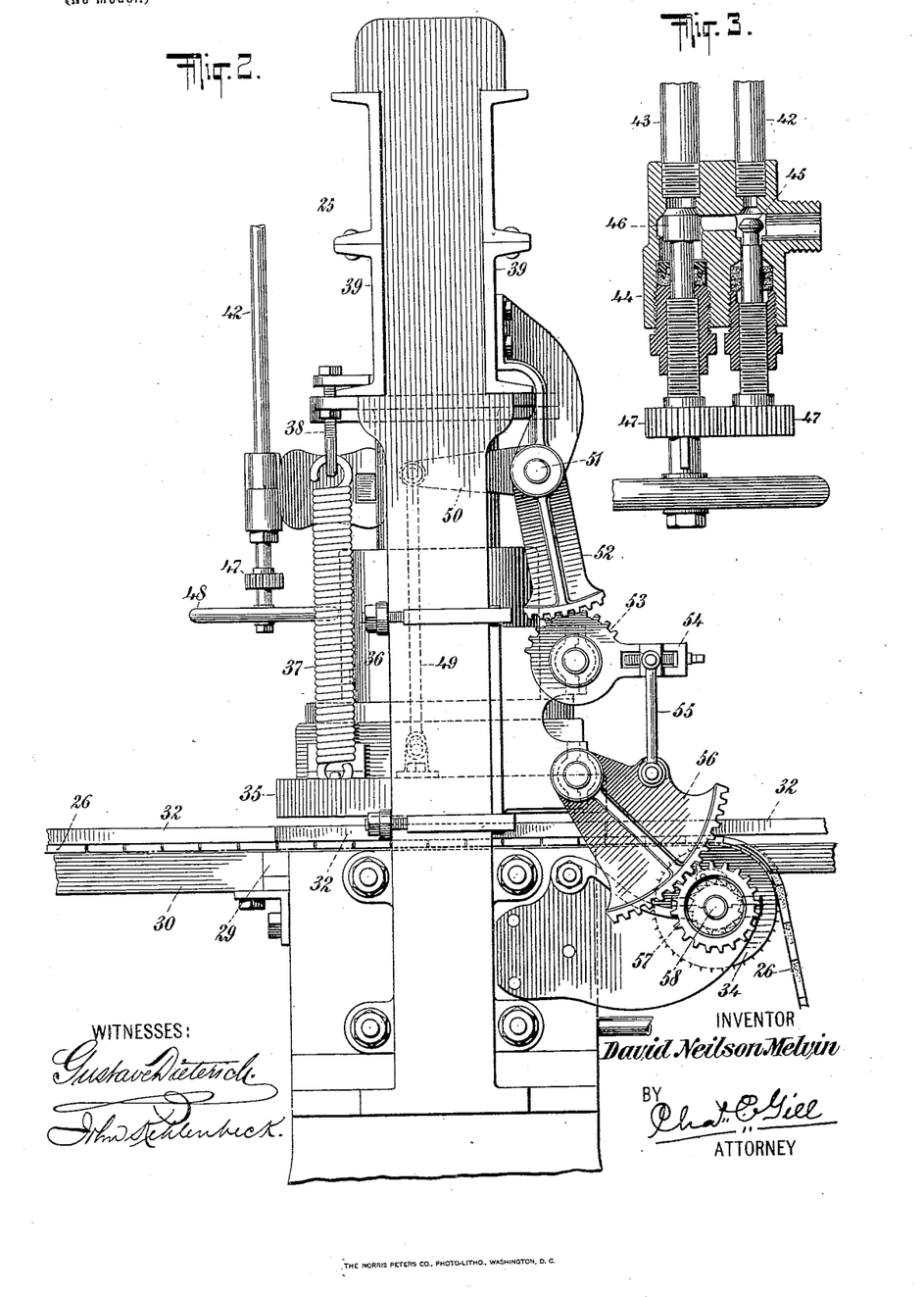
Fig. 2 is an enlarged side elevation of the first press by which the tesseræ are pressed upon the foundation fabric.
Fig. 3 is an enlarged sectional view through a valve-casing forming a feature of the first press.
Figure 4:
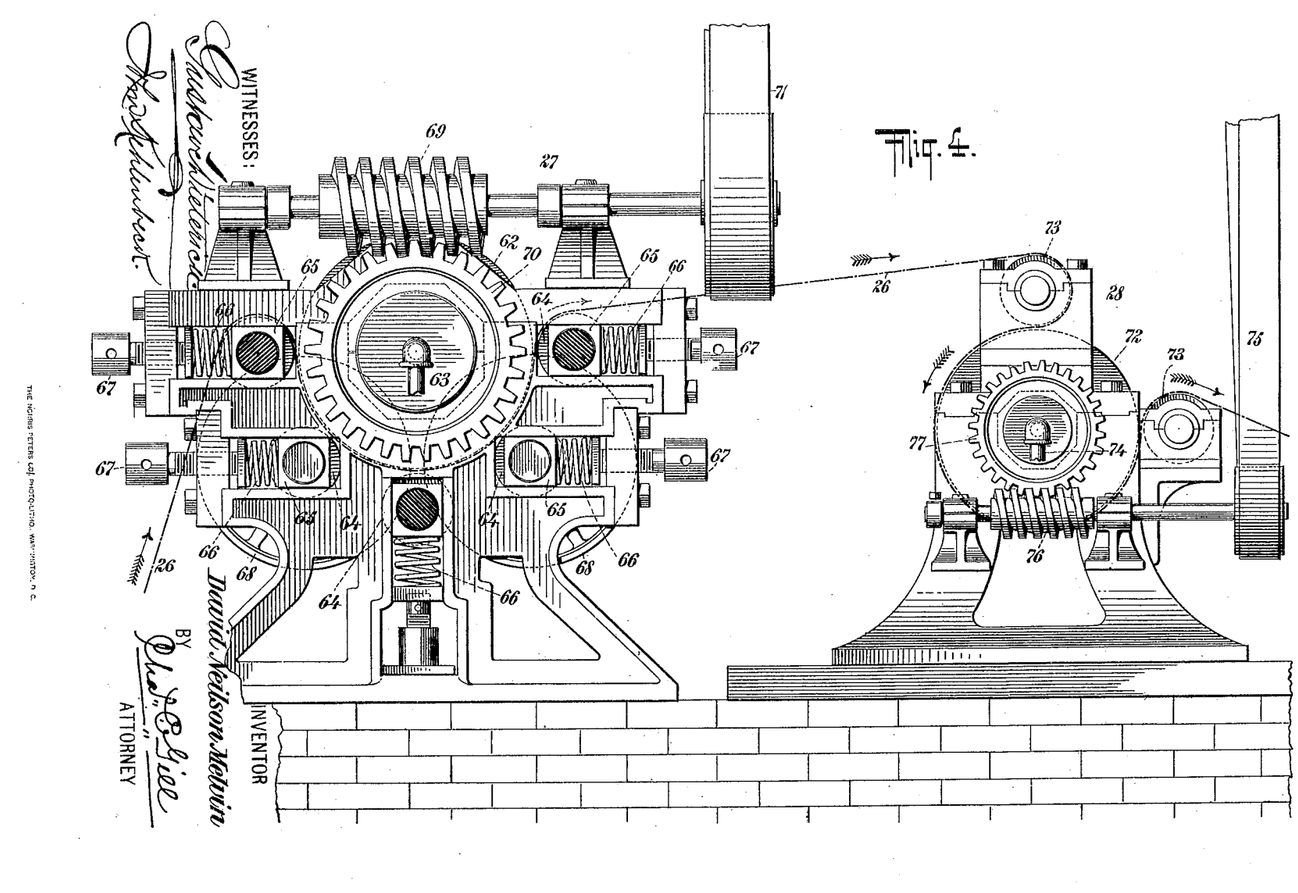
Fig. 4 is an enlarged side elevation, partly in section, of the second press and cold-roller mechanism, the section being on the dotted line 4 4 of Fig. 5.
Figure 5:
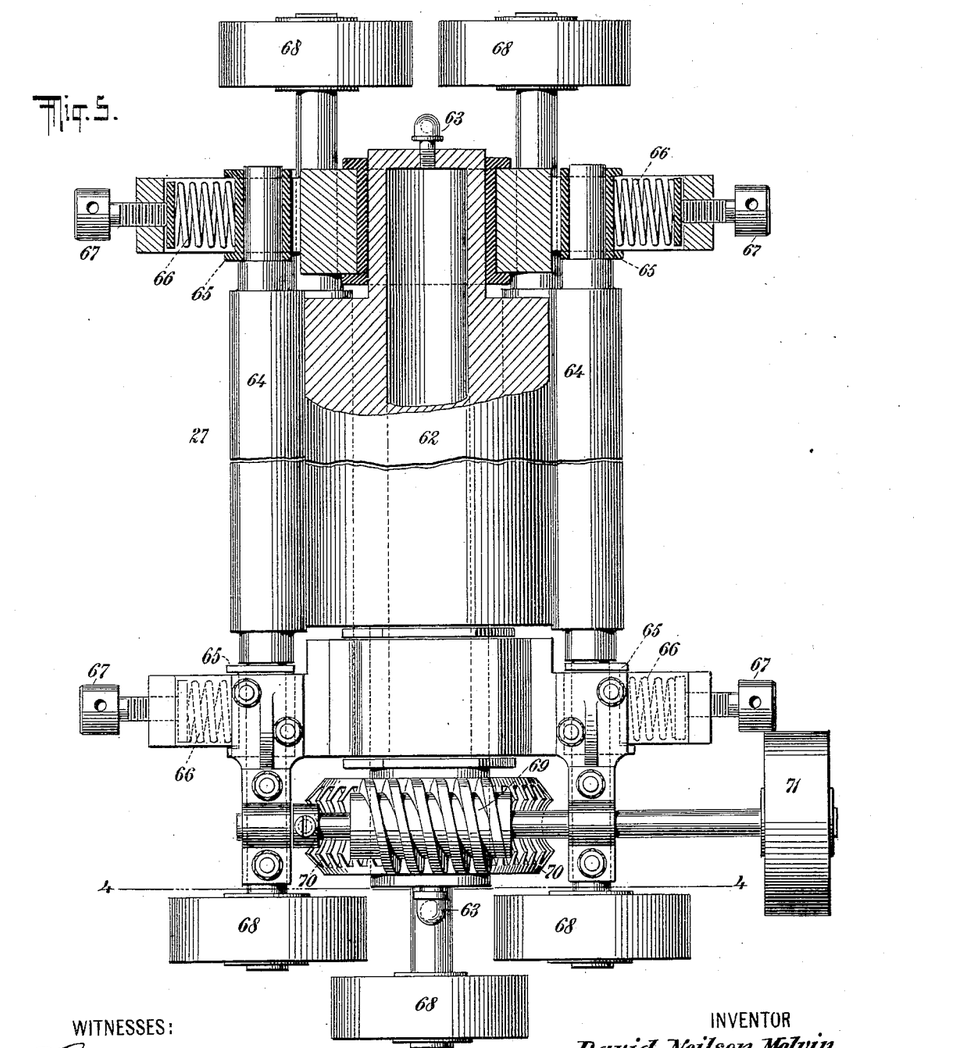
Fig. 5 is an enlarged top view, partly in section and partly broken away, of the second press.
Figure 7:
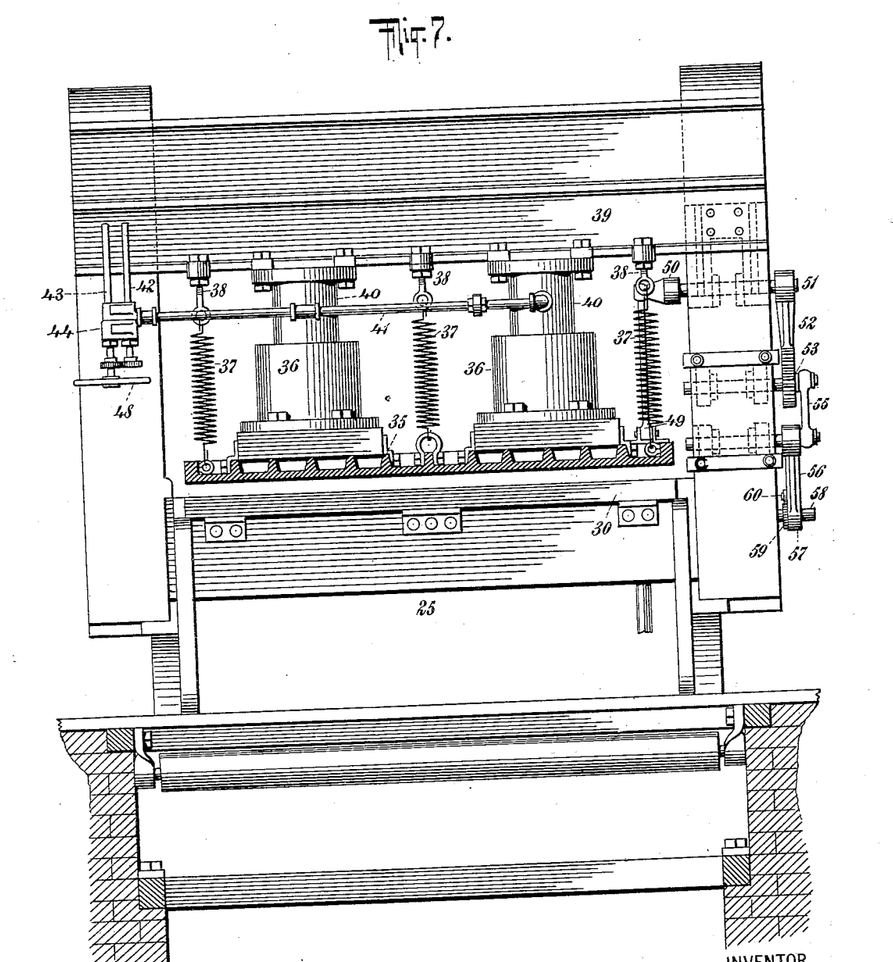
Fig. 7 is a front elevation, partly in section, of same.

The press 25 is provided with a bed-plate 29, a feed-table 30 in advance of said bed-plate 29, and a table 31 in line with and in the rear of said bed-plate 29, and the tables 30 31 and bed-plate 29 form a continuous surface over which the pin-blocks 32 travel, while the canvas or other foundation fabric 26 passes simply over the feed-table 30 and bed-plate 29. At the front end of the table 30 is provided a plain roller 33, over which the canvas 26 passes, and at the rear edge of the bed-plate 29 is provided a roller 34, which has pins distributed over its surface to engage the lower surface of the canvas 26 and turn said canvas downward in the direction indicated in Fig. 1 as said canvas, with the tesseræ thereon, leaves the press 25. Above the bed-plate 29 is disposed the vertically-movable platen 35, upon which are mounted the cylinders 36 36 and which is suspended by coiled springs 37, said spring, being secured at their upper ends to eyebolts 38, supported from the upper transverse beams 39, connecting the end columns of the press. The cylinders 36 receive smaller cylinders 40, into which leads the pipe 41 for the passage of the oil or other liquid to the interior of said cylinders 36 40, said pipe 41 constituting both the inlet-pipe and outlet-pipe for said oil or other liquid, which is supplied from a suitable source under pressure in a well-known manner. The cylinders 36 and 40 are of the usual construction and require no special mention. In the present instance, however, these cylinders are not movable laterally, and the upper cylinders 40 are secured to the beams 39, while the lower cylinders 36 are carried by the platen 35. The oil or other liquid for the cylinders 36 40 is supplied through the pipe 42 and finds an outlet through the pipe 43, which pipes are, as shown in Fig. 3, connected with a valve-casing 44, containing the valves 45 46, whose stems are connected by gear-wheels 47 and one of which is equipped with a convenient hand-wheel 48. The valves 45 46 open alternately, and when the valve 45 is open the oil or other liquid will pass from the pipe 42 through the valve-casing 44 into the pipe 41 and thence enter the cylinders 36 40, causing the cylinders 36 and platen 35 to descend and exert the requisite pressure. When it is desired to relieve the pressure exerted by the platen 35, the valve 45 will be closed, and this will result in the opening of the valve 46, at which time the springs 37 will be enabled to elevate the platen 35 and cylinders 36, and the oil or a portion thereof will be forced back through the pipe 41 and valve-casing 40 into the outlet-pipe 43, the oil on this passage moving around the groove in the stem of the valve 45. The platen 35 does not require to be heated, but the bed-plate 29 will be heated by steam.

The press 25 is equipped with means for automatically feeding the canvas 26 over the table 30 and bed-plate 29, and these means consist of the roller 34, with means intermediate said roller and the platen 35 for effecting the rotation of said roller during the upward movement of the said platen. Upon the platen 35 is secured the lower end of the pitman-rod 49, and the upper end of this rod 49 is secured to the lever-arm 50, fastened upon a crank-shaft 51, upon whose outer end is secured a segment 52, which is in engagement with the segment 53, forming a part of the lever-arm 54. The lever-arm 54 is connected by a rod 55 with the segment 56, and the latter is in engagement with a gear-wheel 57, mounted loosely upon the end of the spindle 58 of the roller 34. Upon the spindle 58 is secured a ratchet-wheel 59, and to the face of the gear-wheel 57 is secured a pawl 60, which engages said ratchet-wheel during the upward motion of the platen 35 and slips over the teeth of said ratchet during the downward motion of the platen 35. During the downward motion of the platen 35 the pitman-rod 49 will rock the shaft 51 and turn the segment 52 rearward, and this will result in the arm 54 being turned downward and through the rod 55 pushing the segment 56 downward, the latter turning the gear-wheel 57 upon the spindle 58, but effecting no movement of the said spindle 58, because at that time the pawl 60 will slip freely over the teeth of the ratchet-wheel 59. During the upward motion of the platen 35 the pitman-rod 49 will be pushed upward and turn the rock-shaft 51 to move the segment 52 inward toward the press 25, and this will result in the arm 54 and segment 56 being moved upward, said segment 56 during its motion rotating the gear-wheel 57 and causing the pawl 60 to act upon the ratchet 59 and effect the rotation of the spindle 58 and roller 34, the roller 34 at such time pulling the canvas 26 from over the bed 29 and turning the same downward into the well 61, the latter, as shown in Fig. 1, being disposed intermediate the presses 25 and 27. The press 25 is thus equipped with automatic means for feeding the canvas 26 over its plate 29. The pins on the roller 34 will enter the interstices of the canvas 26, but will not be of sufficient length to interfere with the tesseræ applied upon said canvas.

The press 27 comprises the large smooth-surfaced hollow roller 62, equipped with means 63 for the admission of steam for heating the same and the series of encompassing smaller rollers 64, the latter being journaled in sliding box-bearings 65 and yieldingly pressed toward the large roller 62 by the springs 66, whose tension is adjustable under the action of the screws 67. The rollers 64 will be driven by suitable belt-wheels 68, and the roller 62 will be driven by a worm 69 and pinion 70, the latter being fast upon the reduced end portion of said roller 62 and said pinion being arranged to have rotary motion imparted to it by means of a suitable belt-wheel 71.

The foundation 26, carrying the tesseræ thereon, passes between the roller 62 and rollers 64, the tesseræ contacting with the roller 62 and the foundation with the rollers 64, the latter serving to press the tesseræ against the said roller 62, which is heated and the heat of which will be imparted to the rollers 64.

The press 27 will feed the foundation 26, carrying the tesseræ through it, and during the passage of the same through the press 27 the latter will exert a finishing pressure against the tesseræ, causing the surface of the floor-cloth to have its proper appearance and the tesseræ to become effectually secured to the canvas and united at their edges.

The foundation 26, carrying the tesseræ, passes into the well 61 from the first press 25 and from said well to the second press 27, and the purpose of looping the fabric within the well 61 is to facilitate the manufacture of the floor-cloth by the two machines 25 and 27. If the fabric 26 should pass on a straight line from the press 25 to the press 27, said presses would be obliged to operate in the most perfect harmony; otherwise the floor-cloth might become distorted or destroyed, especially if the press 27 should continue in operation during any temporary cessation in the feeding of the fabric 26 through the press 25. When, however, the well 61 is provided and a loop in the fabric 26 is formed therein, it will be an easy matter for the attendants to regulate the action of the presses so that neither press will act to the prejudice of the other press.

The floor-cloth upon leaving the press 27 will be drawn away and acted upon by the cold-roller mechanism 28, which comprises the large cold roller 72 and smaller rollers 73. The roller 72 may be of atmospheric temperature or have means, as a pipe 74, for admitting a refrigerant to it. The linoleum face of the floor-cloth will contact with the surface of the roller 72 during the rotation of the latter, and thereby the floor-cloth will become cooled, the said floor-cloth having become heated on its passage through the presses 25 and 27. The roller 72 may be driven from a belt 75 through a worm 76 and pinion 77.

Figure 8:
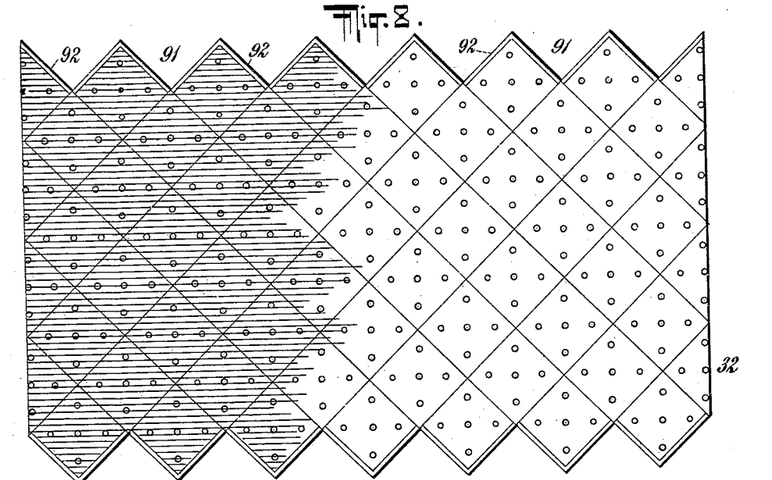
Fig. 8 is an enlarged top view of one of the pattern or pin blocks.
Figure 9:
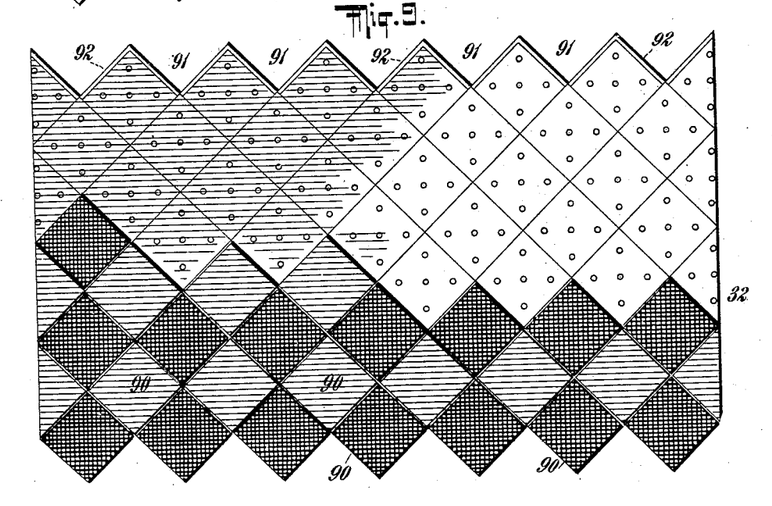
Fig. 9 is a like view of same, showing some of the tesseræ in position thereon.

The pin or pattern blocks 32, which carry the tesseræ and from which the tesseræ are transferred to the canvas or other foundation fabric 26, are illustrated in Figs. 8 and 9, some of the tesseræ (numbered 90) being shown in position on the block in Fig. 9. The pattern or pin blocks 32 do not differ in any essential respect from the pattern or pin blocks shown in the aforesaid patent, No. 412,279, with the exception that in the present case the said blocks 32 are formed with serrated edges 91, conforming to the pattern thereon, and that said blocks are adapted to match one with the other, so that when the blocks are pushed together in edge-to-edge contact the blocks will present a uniform tessera-carrying surface. This feature of the construction may be understood upon reference to Figs. 8 and 9, in which it will be seen that upon the two blocks there shown being pushed together their serrated edges will match and leave a smooth surface carrying the tesseræ. The serrated edges of the blocks 32 will preferably be bound with thin strips of sheet metal 92 for the protection of said edges, and consequently for the preservation of the pattern formed on the blocks.

In the operation of the apparatus made the subject of this application the tesseræ 90 will be placed upon the pin-blocks 32 by hand or machinery in accordance with known methods, and the blocks 32 will one after another be applied upon the bed-plate 29 and table 30 of the press 25. When the first block 32 is inverted upon the canvas 26 and has attained its position below the platen 35 of the press 25, the operator will cause the descent of the platen 35 upon the pin-block thereunder for the purpose of exerting the requisite pressure for causing the tesseræ then at the lower side of said block to firmly adhere to the canvas 26, and thereupon the attendant will place the second pattern or pin block 32 in inverted position upon the canvas 26, stretched across the feed-table 30, taking care to see that the edges of this second block match the serrations in the block then below the platen 35. The attendant will then elevate the platen 35 from the first block 32, and during this action the pin-roller 34 will feed the canvas 26 through the press 25 and cause the said second pin-block 32 to pass directly below the platen 35 and the first pin-block 32 to travel from below the said platen 35 and pass outward upon the table 31, the said first pin-block 32 having the tesseræ stripped from it while passing the roller 34 by reason of the adherence of said tesseræ to the canvas 26 and the pulling downward of the canvas 26 into the well 61 by the pins on said roller 34. The attendant will then cause the platen 35 on the press 25 to descend upon the said second pin-block 32 and effect the requisite pressure to cause the tesseræ thereon to become firmly affixed to the canvas below it, and thereupon the attendant will place a third pin-block 32 in inverted position upon the table 30 and see that its serrated edges match the edges of the said second pin-block then below the platen 35, after which the platen 35 will be elevated from the said second pin-block and the rotation of the roller 34 will draw the second pin-block from position below the said platen 35 and feed the said third pin-block to position below said platen, and thereupon, as before, the platen 35 will be lowered to effect the requisite pressure upon the said third block. This operation will be continued during any period of time or so long as it may be desired to continue the manufacture of the floor-cloth, the attendant constantly supplying the pin-blocks 32, with the tesseræ thereon, to the feed-table 30, and upon each ascent of the platen 35 the roller 34 drawing the canvas and pin-blocks, one after another, first below the platen 35 where the pressure is applied and then outward upon the table 31, from which table 31 the attendants will remove the empty pin-blocks 32 as often as may be required.

After the pressure of the platen 35 has been applied upon the pin-block the tesseræ will adhere to both the pin-block and the canvas 26; but during the outward feeding of the pin-blocks 32 from the press 25 the pin-roller 34 engaging the interstices of the canvas 26 will strip the tesseræ from the pin-blocks, the said tesseræ adhering more firmly to the canvas 26 than to the pin-blocks. The canvas 26, carrying the tesseræ removed from the pin-blocks 32, will travel downward into the well 61 and then upward to and through the press 27 and cold-roller mechanism 28, whence the floor-cloth will be wound into a roll or otherwise conveniently disposed of.

The tesseræ placed upon the pin-blocks 32 will be in an unseasoned state or of a somewhat adherent spongy texture and will while in this condition be applied upon the canvas or foundation fabric 26, the tesseræ when in this condition being capable of being manufactured into the finished floor-cloth by the continuous method hereinbefore described.

The platen 35 of the press 25 will correspond with the surface area of a pin-block 32, the latter being about six feet long to correspond with the width of the fabric 26. The rollers of the press 27 and cooling mechanism 28 will be a little greater in length than the width of the fabric 26.

The first press and the pattern-blocks having the serrated edges are not separately claimed herein, since they have been made the subject of a separate application filed concurrently herewith.

What I claim as my invention, and desire to secure by Letters Patent, is—

1. In a machine for making inlaid floor-cloth, the first press having the bed-plate and platen between which the foundation fabric passes and which are adapted to receive between them the pattern or pin blocks carrying the tesseræ to be transferred to said fabric, combined with the second press which receives said fabric with the tesseræ thereon and subjects the same to heat and finishing pressure, said second press comprising the heated roller and the series of smaller rollers encompassing the same and between which and said heated roller said fabric passes, said smaller rollers pressing the floor-cloth against said heated roller; substantially as set forth.

2. In a machine for making inlaid floor-cloth, the first press having the bed-plate and platen between which the foundation fabric passes and which are adapted to receive between them the pattern or pin blocks carrying the tesseræ to be transferred to said fabric, combined with the second press which receives said fabric with the tesseræ thereon and subjects the same to heat and finishing pressure, said second press comprising the heated roller, the series of smaller rollers encompassing the same and between which and said heated roller said fabric passes, the series of sliding bearings for said smaller rollers, the springs pressing said smaller rollers toward said heated roller, and means for controlling said springs; substantially as set forth.

3. In a machine for making inlaid floor-cloth, the first press having the bed-plate and platen between which the foundation fabric passes and which are adapted to receive between them the pattern or pin blocks carrying the tesseræ to be transferred to said fabric, and means for feeding said foundation fabric through said press, combined with the heated press through which said fabric with the tesseræ thereon passes and which subjects the same to finishing pressure, and the cold roller over which the floor-cloth is carried after leaving said heated press; substantially as set forth.

4. In a machine for making inlaid floor-cloth, the first press having the bed-plate and platen between which the foundation fabric passes and which are adapted to receive between them the pattern or pin blocks carrying the tesseræ to be transferred to said fabric, and means for feeding said foundation fabric through said press, combined with the heated press through which said fabric with the tesseræ thereon passes and which subjects the same to finishing pressure, and the cold-roller mechanism through which the floor-cloth passes after leaving said heated press, said cold-roller mechanism comprising the large roller and the smaller roller with means for driving the said large roller; substantially as set forth.

5. In a machine for making inlaid floor-cloth, the first press by which the tesseræ are pressed upon and attached to the foundation fabric, combined with the second or heated press through which said fabric with the tesseræ thereon passes and which subjects the same to finishing pressure, and the cold roller over which the floor-cloth is carried after leaving said heated press; substantially as set forth.

6. In a machine for making inlaid floor-cloth, the first press having the bed-plate and platen between which the foundation fabric passes and which are adapted to receive between them the pattern or pin blocks carrying the tesseræ to be transferred to said fabric, and means for feeding said foundation fabric through said press, combined with the heated press, through which said fabric with the tesseræ thereon passes and which subjects the same to finishing pressure, and the cold roller over which the floor-cloth is carried after leaving said heated press, said heated press comprising the large heated roller and the series of encompassing smaller rollers with means for driving said rollers; substantially as set forth.

Signed at New York, in the county of New York and State of New York, this 22d day of October, A. D. 1901.

DAVID NEILSON MELVIN.

Witnesses:
CHAS. C. GILL,
GUNDER GUNDERSON.